US007126277B2

(12) United States Patent
Bettinelli et al.

(10) Patent No.: US 7,126,277 B2
(45) Date of Patent: Oct. 24, 2006

(54) PLASMA PANEL HAVING AN ARRAY OF BARRIER RIBS PROVIDED WITH CAVITIES THAT EMERGE VIA THEIR TOP

(75) Inventors: Armand Bettinelli, Coublevie (FR); Jean-Claude Martinez, Chartres de Bretagne (FR)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/782,282

(22) Filed: Feb. 19, 2004

(65) Prior Publication Data

US 2004/0189171 A1 Sep. 30, 2004

(30) Foreign Application Priority Data

Feb. 21, 2003 (FR) .................................. 03 02163

(51) Int. Cl.
*H01J 17/49* (2006.01)
*G02F 1/1333* (2006.01)

(52) U.S. Cl. ........................................ 313/582; 349/60

(58) Field of Classification Search ........ 313/582–587; 349/60, 66, 76

See application file for complete search history.

(56) References Cited

U.S. PATENT DOCUMENTS

| | | | | |
|---|---|---|---|---|
| 5,825,128 | A | 10/1998 | Betsui et al. | 313/582 |
| 6,313,580 | B1 * | 11/2001 | Makino | 313/582 |
| 6,670,756 | B1 * | 12/2003 | Lin et al. | 313/582 |
| 6,768,485 | B1 * | 7/2004 | Awamoto et al. | 345/204 |
| 6,787,978 | B1 * | 9/2004 | Yura et al. | 313/483 |
| 6,841,928 | B1 * | 1/2005 | Kang | 313/483 |
| 6,965,200 | B1 * | 11/2005 | Kimura et al. | 313/582 |
| 6,965,201 | B1 * | 11/2005 | Kimura et al. | 313/582 |
| 6,967,442 | B1 * | 11/2005 | Kimura et al. | 313/582 |
| 2001/0026255 | A1 * | 10/2001 | Sano et al. | 345/60 |
| 2002/0047519 | A1 * | 4/2002 | Kunii et al. | 313/584 |
| 2003/0214236 | A1 * | 11/2003 | Kao et al. | 313/587 |
| 2004/0113553 | A1 * | 6/2004 | Yoon et al. | 313/582 |

FOREIGN PATENT DOCUMENTS

| | | | |
|---|---|---|---|
| EP | 1187166 A2 | | 3/2002 |
| JP | 56134451 | | 10/1981 |
| JP | 2003157773 A | * | 5/2003 |
| WO | WO 98/54743 | | 12/1998 |
| WO | WO 00/46832 | | 8/2000 |

OTHER PUBLICATIONS

WO 02/052602 to Bettinelli; "Process for Manufacturing Barriers for a Plasma Display Panel." Jul. 4, 2002.*
Machine translation of JP 200315773.*

* cited by examiner

*Primary Examiner*—Nimeshkumar D. Patel
*Assistant Examiner*—Peter Macchiarolo
(74) *Attorney, Agent, or Firm*—Joseph J. Lake; Harvey D. Fried; Patricia A. Verlangie

(57) ABSTRACT

A plasma panel including two plates having a sealed space between them is disclosed. The sealed space is filled with discharge gas and is divided into discharge cells that are bounded between these plates by barrier ribs forming an array. The barrier rib portion that separates any two adjacent cells of the same column includes a cavity that is made in the thickness of that rib, and a notch that brings these two cells into communication with each other through the cavity. Such an arrangement makes it easier to apply the phosphors on the walls of the cells, while at the same time eliminating any risk of optical crosstalk.

6 Claims, 4 Drawing Sheets

PRIOR ART

PRIOR ART

PLASMA PANEL HAVING AN ARRAY OF BARRIER RIBS PROVIDED WITH CAVITIES THAT EMERGE VIA THEIR TOP

FIELD OF THE INVENTION

The invention relates to a plasma panel comprising two plates that leave a sealed space between them, which space is filled with discharge gas and is divided into discharge cells that are bounded between these plates by barrier ribs forming an array, and at least two arrays of electrodes arranged in such a way that one electrode of each array crosses over each cell.

BACKGROUND OF THE INVENTION

Document WO 00/46832 (FUJITSU) describes, in particular in FIG. 15, reproduced in FIGS. 1 and 2 below, a plasma panel, in which an array of barrier ribs define the cells 1 and includes a series of narrow ribs 2 that are continuous, parallel and directed along a first direction along with a series of thick ribs 3 that are discontinuous, parallel and directed along a second direction perpendicular to the first. The narrow ribs 2 define cell columns and the thick ribs 3 define cell rows. In each cell 1, each thick rib 3 is interrupted by a notch 4, 4' that extends over the entire height of the rib. The notch is positioned in a plane of symmetry of the cell parallel to the direction of the columns.

For such a plasma panel, the side walls of the barrier ribs 2, 3 and the bottom of the cells 1 are generally covered with a layer of phosphor intended to emit visible light, generally red, green or blue, after excitation by radiation emitted by the plasma discharge in these cells.

In such a plasma panel, the arrangement of the pixels is generally organized in such a way that the adjacent cells of the same column, which are bounded by thick barrier ribs, are provided with phosphors of the same emission color. Adjacent cells of the same row, which are bounded by narrow barrier ribs, are provided with phosphors of different emission colors.

These phosphors are generally applied as a liquid paste, for example by screen printing or by dispensing. During application of this paste, the screen printing squeegee or the dispensing syringe is therefore moved in the direction of the columns in such a way that, between each cell, there is a risk of phosphors being unnecessarily deposited on the top of the thick ribs. Such deposition runs the risk of causing optical crosstalk phenomena between the cells and covering the notches 4, 4'. The notches 4, 4' are important because they make it easier to pump the panel, that is to say to remove the gas between the plates before filling with the discharge gas, this being particularly useful when the barrier ribs are not porous.

However, such notches have drawbacks, especially that of also causing crosstalk, since the cells are less isolated from one another than when there are no notches. It is therefore recommended to limit the width of these notches, thereby reducing their effectiveness in preventing inopportune deposition of phosphors on the tops of the thick ribs.

One objective of the present invention proposes barrier rib structures that are better suited to preventing the risks of crosstalk.

Document EP 1 187 166 (FUJITSU) discloses a plasma panel having an array of cell-defining barrier ribs that is identical to the one just described, except that, instead of having notches passing through the thick ribs separating the rows of the cells, cavities are provided in the thickness of these ribs, which cavities emerge at the top of these ribs. Each cavity has side walls that isolate it from each of the adjacent cells and extend so as to be level with the tops of the ribs. Owing to the height of these walls, the risks of crosstalk are thus further reduced, since the adjacent cells are isolated from one another.

However, such an array of barrier ribs with cavities in their thickness has drawbacks such that during application of the phosphors, luminescent material may nevertheless be deposited on the tops of the barriers, outside the cavities. Also, there is a risk of encountering difficulties when pumping the panel, that is to say difficulties in removing the gas between the plates before filling with the discharge gas.

Document JP 56-134451 discloses a plasma panel having an array of barrier ribs that is quite similar to that disclosed in the aforementioned document EP 1 187 166. In that panel, the cavities separating the adjacent cells of the same column are used to initiate or ignite the discharges that then propagate in the cells. In no case are there notches connecting each cavity to the two adjacent cells of the same row.

SUMMARY OF THE INVENTION

It is an object of the present invention to avoid the aforementioned drawbacks. For this purpose, the subject of the invention is a plasma panel comprising two plates having a sealed space between them, which space is filled with discharge gas and is divided into discharge cells that are bounded between these plates by barrier ribs forming an array. The discharge cells are distributed in rows and columns, in which the barrier rib portion that separates any two adjacent cells of the same column includes a cavity that has the same thickness of the rib and emerges at the top of the rib. According to the invention as claimed below, the barrier rib portion also includes a notch that brings two adjacent cells into communication with each other through the cavity.

The cavities made in the thickness of the barrier ribs are therefore open and communicate with the adjacent cells via these notches. Such an arrangement makes it even easier to apply the phosphors while still limiting, however, the risks of crosstalk, especially if these phosphors fill up the notches. If the porosity of the barrier ribs is greater than or equal to 25%, the width of the notches, measured in the direction of the rows, is preferably less than 60 μm. Notches as narrow as this are sufficient to solve the phosphor-application problem and do not hamper pumping of the panel, which is made even easier by the porosity of the barrier ribs.

The term “top” is understood to mean the surface of the barrier ribs that is in contact with one of the plates, without being fastened to that plate. The surface of the barrier ribs which is in contact with the other plate is generally fastened to that plate and forms the base of the ribs.

Preferably, each cavity has side walls that extend so as to be level with the tops of the ribs. Thus the risks of crosstalk are further reduced, since the adjacent cells of one and the same column are better isolated from one another.

This cavity is preferably centred in a plane of symmetry of the column of cells. Preferably, this cavity is approximately cylindrical, the generatrix of the cylinder being perpendicular to the plates. The cross section of the cylinder may have the shape of a square, diamond, polygon, circle or ellipse, or any other suitable shape.

Rows and columns may be reversed without departing from the invention.

The plasma panel according to the invention preferably has at least two arrays of electrodes arranged in such a way that one electrode of each array crosses over each cell. These arrays of electrodes are generally carried by one or other plate or both plates. Preferably, the side walls of the barriers are covered, at least partly, with phosphors, and the cavities are filled, at least partly, with phosphors.

The invention makes it possible to prevent, more effectively than in the prior art, the tops of the cavitied barrier ribs from being covered with phosphors when conventional application processes, such as screen printing or dispensing, are used. This is because during application of the phosphors to the walls of the barrier ribs and to the plate on which these ribs rest, between the cells, the phosphors flow into the cavities and into the notches, since these cavities and notches emerge via the tops of the ribs. Thus, since this avoids phosphors being deposited on the tops of the ribs, there is improved regularity of the contact between the tops of the ribs and the plate that bears on these tops, thereby reducing the risks of crosstalk. Additionally, the notches reduce the difficulties of pumping the panel, especially if the barrier ribs are not porous.

Preferably, the depth of the said cavities is greater than or equal to one third of the height of the barrier ribs. The height of the ribs generally corresponds to the distance between the plates. Preferably, the maximum width of the cavities, measured in the direction of the rows, is greater than or equal to 50 μm. Preferably, the maximum width of the cavities, measured in the direction of the rows, is greater than or equal to twice the width of the notches, measured in the same direction.

In general, the dimensions and the shape of the cavities and of the notches are tailored, in a manner known per se, to the phosphor-application conditions in order to reduce the risks of crosstalk. In particular, “application conditions” are understood to mean the conditions under which the method used is implemented and the physical-chemical characteristics of the phosphor paste, especially its viscosity.

Preferably, the height of the barrier ribs is greater than or equal to 120 μm.

BRIEF DESCRIPTION OF THE DRAWINGS

The invention will be more clearly understood on reading the description that follows, given by way of non-limiting example and with reference to the appended figures, in which.

DETAILED DESCRIPTION

Figure 1:
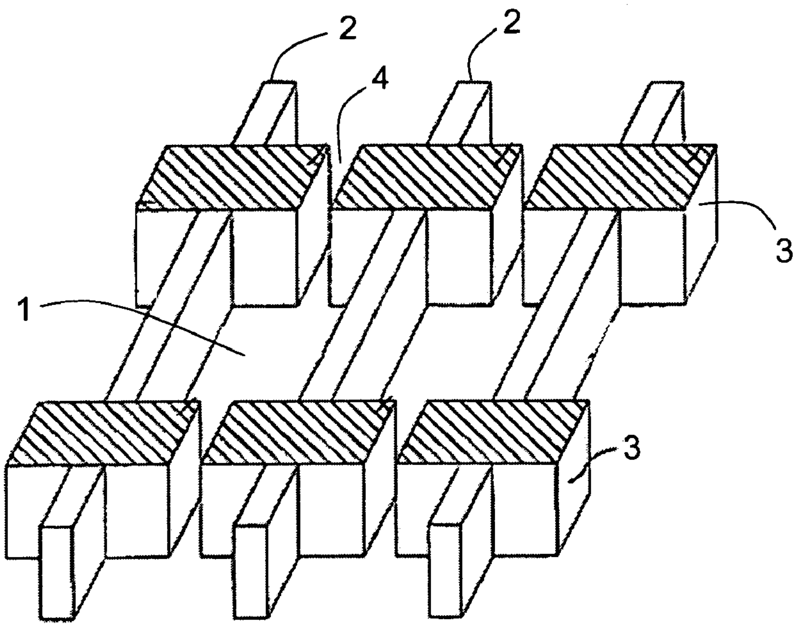
FIG.1 PRIOR ART
FIGS. 1 and 2, already described, are perspective diagrams of arrays of barrier ribs with notches of the prior art, such as those described in WO 00/46832.
Figure 2:
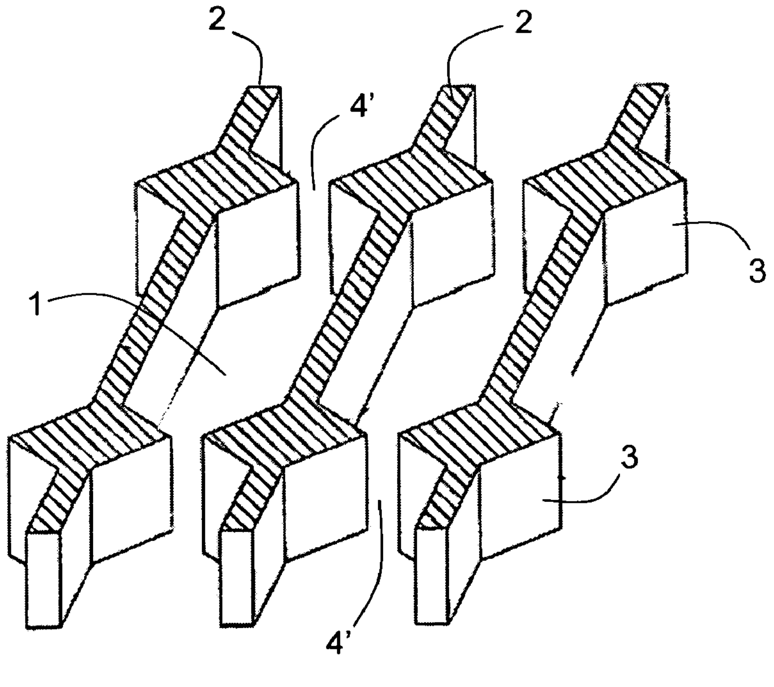

To simplify the description and bring out the differences and advantages of the invention compared with the prior art, identical references will be used for the elements that fulfil the same functions.

One method of fabricating a plasma panel according to the invention will now be described, in this case a panel provided with cells arranged in straight rows and columns, especially the details concerning the fabrication of the plate bearing the array of barrier ribs, which are also straight, in this case the rear plate.

Fabrication starts with a plate of soda-lime glass having dimensions of for example, 254 mm×162 mm×3 mm, provided with an array of electrodes formed of silver conductors. The array itself being coated with a conventional dielectric layer baked at 540° C.

Described below is the fabrication of an array of barrier ribs on this plate so as to obtain a series of continuous parallel ribs 2, having a thickness of 60 to 70 μm, for separating the columns, distributed with a pitch of 360 μm, and, a series of parallel ribs 3, having a thickness of 220 to 230 μm, provided with cavities, for separating the rows, which are distributed with a pitch of 1080 μm.

Each of the cells thus defined by these barrier ribs has a rectangular shape with dimensions of 850 μm×190 μm approximately. A paste, intended to form, after application and drying, a green (i.e. unbaked) barrier rib layer on the plate, is prepared, comprising 4% by weight of organic binder and 5% by weight of mineral binder based on a vitrifiable frit, the balance being an alumina-based mineral filler. The plate is coated by screen printing with six superimposed layers of this paste, each pass being followed by drying at 105° C. A plate provided with a green barrier rib layer 155 μm in thickness is thus obtained.

A description will now be given of how the array of barrier ribs is formed in the thickness of the screen layer by means of abrasion. Firstly, a protective mask is applied to this layer. The said mask having apertures or features at the location of the cells and of the cavities to be hollowed out by abrasion in the thickness of the green layer. This mask is formed in a manner known per se by photolithography of an elastic organic film deposited on the green layer. The patterns of the mask are made, in a manner known per se, to match the shape and the size of the barrier ribs and the cavities to be obtained.

To form the barrier ribs and the cavities in the thickness of the ribs, the mask is blasted with an abrasive material using a nozzle with a linear slot 200 mm in length. A metal powder, with the reference S9 grade 1000, sold by Fuji is used, for example, as the abrasive material. During the blasting operation, called sandblasting, the sandblasting nozzle is kept at about 10 cm from the plate and moves at a speed of about 50 mm/min along the barrier ribs to be formed and, during sandblasting, the green plate moves at a speed of 65 mm/min in a direction perpendicular to that of the barrier ribs. The sandblasting pressure is around 0.04 MPa.

Next, the mask is removed by spraying, at 35° C., an aqueous solution containing 1% sodium hydroxide (NaOH); after rinsing with water and drying under a 50° C. air knife, a plate provided with an array of green barrier ribs around 150 μm in height is obtained. Depending on the features made in the mask, a plate provided with an array of barrier ribs as shown in FIGS. 5 to 6 is obtained with cylindrical cavities 51 of square cross section as shown in FIG. 5, with cylindrical cavities 52 of circular or elliptical cross section as shown in FIG. 5, and with notches 4 of rectangular cross section, which bring the cells of one and the same column, in FIGS. 5 and 6, into communication with one another, where, in particular, the maximum width of the cavities, measured in the direction of the rows, is greater than or equal to 120 μm, whereas the width of the notches measured in the same direction is around 40 μm.

Leaving each cavity are two notches, one emerging in the upper adjacent cell and the other emerging in the lower adjacent cell. Thus, the adjacent cells of one and the same column communicate with one another via the cavities. The depth of the cavities made in the thickness of the barrier ribs exceeds 50 μm and may cover the entire height of the ribs.

Figure 3:
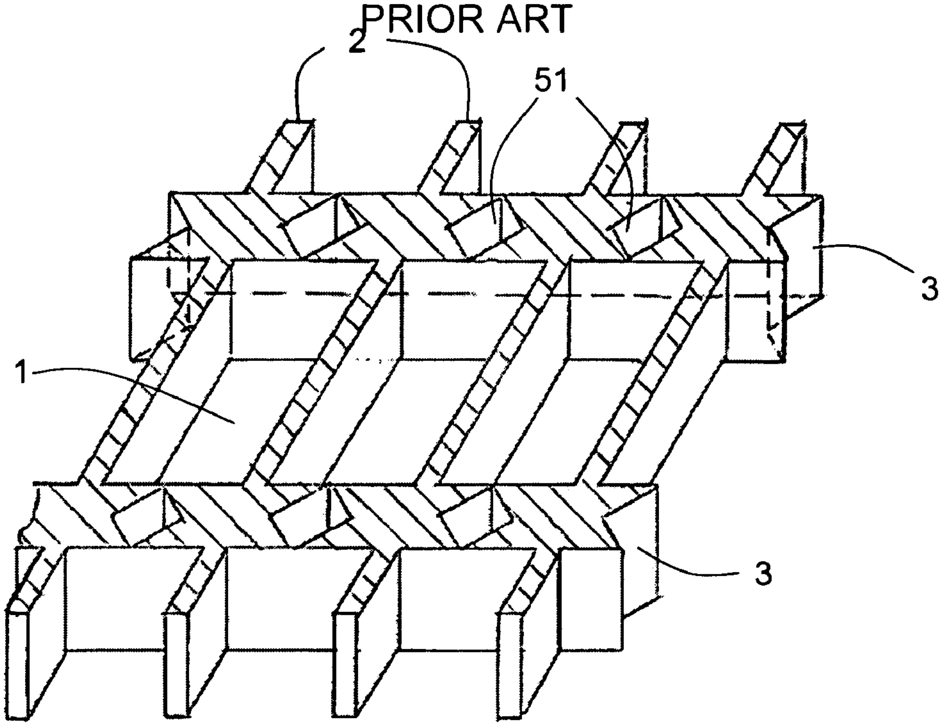
FIG.3 PRIOR ART
FIGS. 3 and 4 are diagrams in the same perspective view as FIGS. 1 and 2 of arrays of barrier ribs with cavities and without notches, as in EP 1 187 166; in this case, the cavities have different shapes and/or are directed differently compared with the cavities described in EP 1 187 166.
Figure 4:
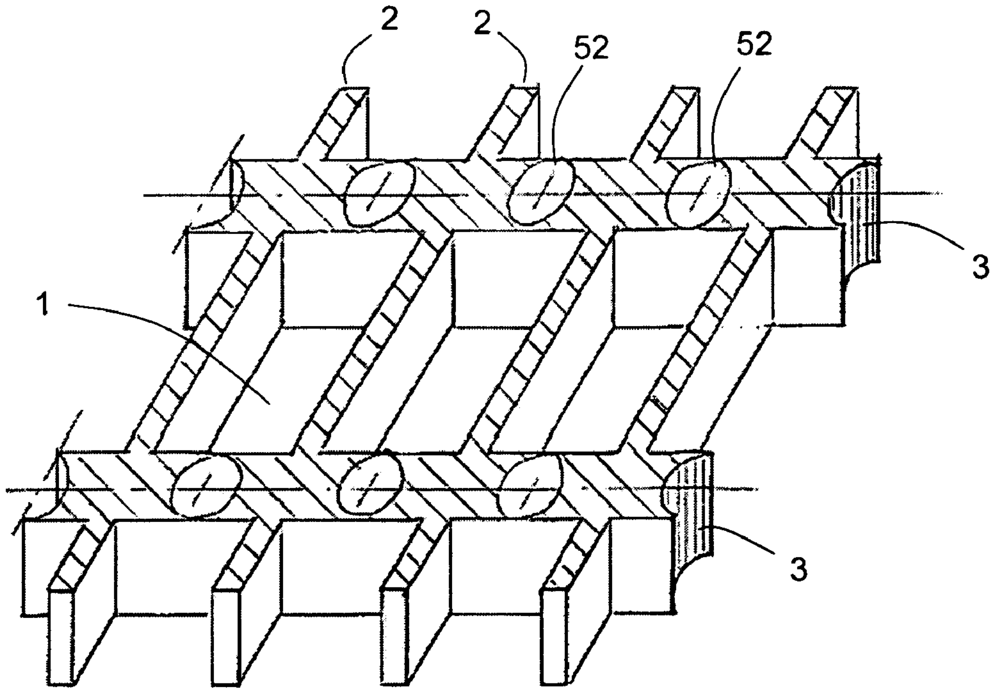
Figure 5:
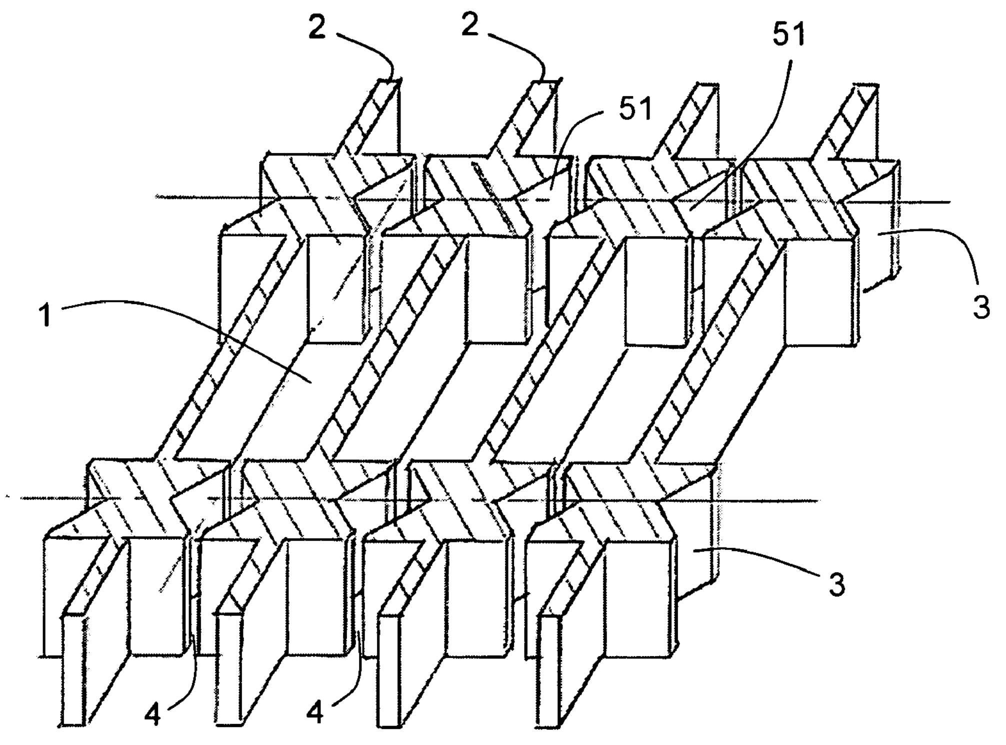
FIGS. 5 and 6 are diagrams in the same perspective view as FIGS. 1 and 2 of arrays of barrier ribs with cavities and with notches according to a first embodiment of the invention.
Figure 6:
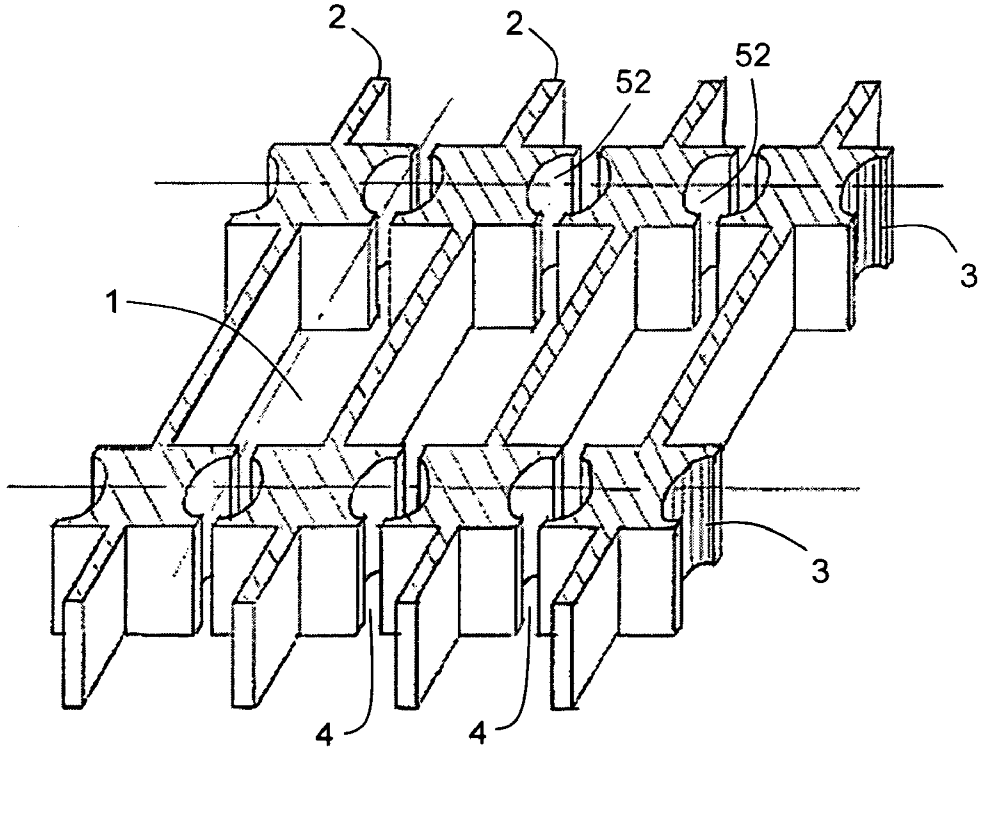

FIGS. 3 and 4 show a plate provided with an array of barrier ribs, which are identical to FIGS. 5 and 6 respectively, except that these ribs do not have notches. The barrier ribs shown in FIGS. 3 and 4 do not form part of the invention as claimed below.

The application of the phosphors by dispensing will now be described. Phosphor pastes having viscosities of around 3 Pa are prepared by dispersing 30 g of powdered phosphors in 70 g of a cellulose solution. One paste is prepared for each primary color: red, green and blue.

To deposit the green (unbaked) layers of phosphors on the side walls of the green (unbaked) barrier ribs and the bottom of the cavities, the procedure is as follows. The procedure uses a dispensing head having a multitude of calibrated orifices 50 μm in diameter, which are arranged with a 1080 μm pitch corresponding to the distance (3×360 μm) between two areas of the same color or to a multiple of this pitch, in order to make it easier to produce such a head. The head continuously dispenses the paste while moving along the direction of the columns. The stream of paste is interrupted during lateral displacement of the head along the direction of the rows until it comes vertically in line with the cells that are able to receive the same paste, but which have not yet been filled, owing to a limited width of the dispensing head. The same continuous paste-dispensing process is repeated while this head makes a scan along the direction of the columns over a new area of the plate. Such above operations being repeated with the same paste until the plate has been fully treated.

These operations are repeated for each primary color using the same process but with a head offset by one column pitch (360 μm) in the case of the second color and by a further pitch in the case of the third color. The plate is dried at 120° C. after the three colors have been deposited.

Thanks to the cavities 51 or 52 and to the notches 4 made in the thickness of the barrier ribs, when the dispensing head passes over the top of the barrier ribs separating the rows the phosphor, paste flows into the reservoirs formed by these cavities and into these cavities without leaving any significant residue on the top of the barrier ribs, thereby making it possible subsequently to provide good contact between the tops of the ribs and the front face, and consequently to reduce the risks of crosstalk between cells.

According to a variant, these same phosphors may be applied by direct screen printing of a phosphor paste in the cells formed between the ribs. The procedure is then as follows. The procedure uses a screen-printing screen comprising a metal cloth made up from 120 wires per cm, impermeabilized by a photosensitive emulsion, except for strips 90 μm in width located in the regions where the paste must be transferred, that is to say arranged with a pitch of 1080 μm (3×360 μm) corresponding to the distance between two consecutive columns of cells of the same color. The paste is direct screen printed using one of the phosphor pastes through this screen, that is to say the paste is transferred locally in the regions where the metal cloth has not been impermeabilized. After the paste is applied to the plate, such plate is dried at 120° C.

These operations are repeated for each primary color using the same screen, which is offset in the direction of the rows by the column pitch (360 μm) in the case of the second color and by a further pitch in the case of the third color.

As in deposition by dispensing, thanks to the cavities 51 or 52 and to the notches 4 made in the thickness of the barrier ribs, when the screen-printing squeegees pass over the top of the barrier ribs separating the rows the phosphor paste flows into the reservoirs formed by these cavities and into these cavities, without leaving any significant residue on the tops of the ribs. In this way, the risks of crosstalk between cells are reduced. The presence of notches 4, as in the embodiments shown in FIGS. 5 and 6, provides an additional advantage as these notches prevent a break in the flow of paste as the squeegees pass over the top of the thick barrier ribs separating the rows, thereby making it possible for the cells to be more easily and more uniformly filled with the phosphor paste.

If the barrier-rib material is not porous, especially if its porosity is less than about 2%, it is advantageous to use notches 4 of sufficiently large width, preferably greater than 60 μm, so that the phosphors do not fill these notches over their entire height when the phosphor paste is applied. Thus, the opening that remains in these notches will make it easier to pump the panel after the two plates have been joined together.

If the barrier-rib material is porous, especially when this material has a mean porosity greater than or equal to 25% as described in document WO 02/052602, the porosity of the ribs makes it easier to pump the panel, and it is then unnecessary to keep an opening in the notches after application of the phosphors; however, it is advantageous to have, after application of the phosphors, a closed goffered structure, while still benefiting from the partially open structure for the transfer process. Since the mere presence of reservoirs formed by the cavities hollowed out in the thickness of the barrier ribs prevents excess thicknesses on the tops of the ribs, it is thus possible, by reducing the width of the notches, especially to below 60 μm, and by making use of the capillary forces, to virtually completely fill these notches with the phosphor paste. On the one hand, any communication between cells is thus avoided, and hence any risk of crosstalk, and, on the other hand, the light emission is optimized owing to more complete coverage with phosphors on the walls of the cell, the coverage being located only in those areas of the plate that will not be masked by the black matrix of the front plate that will be positioned so as to face the tops of the ribs, especially the tops of the thick ribs separating the rows.

In this way, a rear plate is obtained that is provided with an array of green barrier ribs whose side walls, among other surfaces, are coated with a green (unbaked) layer of phosphors.

The entire plate is then baked. During baking, the maximum temperature is 480° C., this maximum temperature being maintained for about 30 minutes.

A plate provided with an array of baked phosphor-coated barrier ribs is obtained. The ribs obtained here are porous and the dimensions of the baked ribs are unchanged relative to those of the green ribs. the open porosity of these ribs is around 30%.

According to a variant of the invention, it is possible to produce an array of barrier ribs of low porosity on the plate by using other, known formulations of barrier rib materials.

To obtain a plasma display panel according to the invention, a conventional front plate, generally provided with a black matrix for contrast enhancement, is joined to the plate according to the invention on which a conventional seal has been provided beforehand. The two plates are sealed by a heat treatment at 400° C. The air contained between the plates is pumped out. The panel is filled with low-pressure discharge gas, and the pumping port is sealed off.

Figure 7:
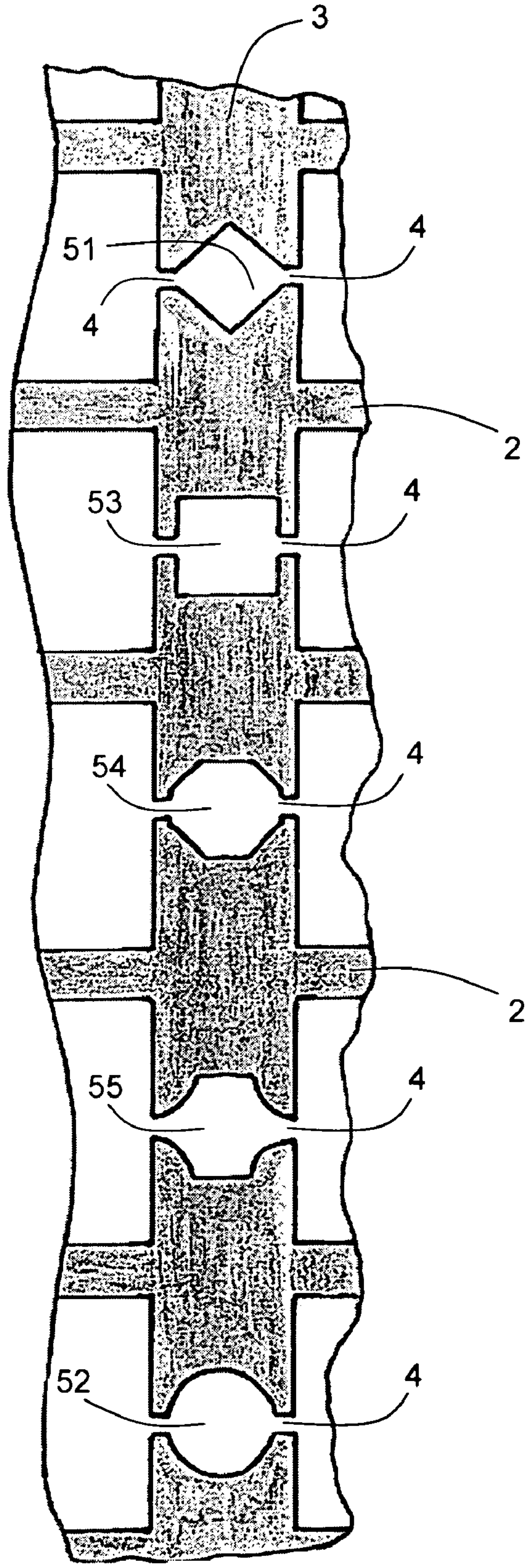
FIG. 7 is a partial view, seen from above, of an array of barrier ribs with various shapes of cavities, and with notches, according to other embodiments of the invention.

Without departing from the invention, it is possible to envisage other cavity shapes, as shown in FIG. 7. Apart from the square cross section 51 and the circular cross section 52 already described, this figure shows another square cross section 53 in a different orientation and a hexagonal cross section 54, with or without notches 4. There is also a shape 55 that allows notches 4 to be produced which become narrower as they approach the adjacent cells.

The present invention applies to any type of plasma panel whose cells are compartmentalized by barrier ribs whose side walls are covered, at least partly, with phosphors. These plasma panels may be of the coplanar type or the matrix type, or else panels operating by radiofrequency or microwave excitation.

What is claimed is:

1. Plasma panel comprising two plates leaving a sealed space between them, which space is filled with discharge gas and is divided into discharge cells that are bounded between these plates by barrier ribs forming an array, the said cells being distributed in rows and columns, characterized in that the barrier rib portion that separates any two adjacent cells of the same column includes a cavity that is made in the thickness of the said rib and emerges at the top of the said rib, and also includes a notch that brings the two said cells into communication with each other through the said cavity, wherein the cavity has sidewalls that extend so as to be level with the top of the ribs.

2. Plasma panel according to claim 1, wherein that the depth of the said cavities is greater than or equal to one third of the height of the said barrier ribs.

3. Plasma panel according to either of claim 1, wherein that the maximum width of the cavities, measured in the direction of the said rows, is greater than or equal to 50 μm.

4. Plasma panel according to claim 1, wherein that the maximum width of the cavities, measured in the direction of the said rows, is greater than or equal to twice the width of the notches measured in the same direction.

5. Plasma panel according to claim 1, wherein that the said barrier ribs have a porosity that is greater than or equal to 25% and in that the width of the notches, measured in the direction of the said rows, is less than 60 μm.

6. Plasma panel according to claim 1, characterized in that the height of the said barrier ribs is greater than or equal to 120 μm.

* * * * *